DRIVE MECHANISM AND STOP MECHANISM

Original Filed Jan. 14, 1953 13 Sheets-Sheet 1

INVENTORS C.R.KEITH
C.A.NICKERSON
BY V. P. Priolo
ATTORNEY

March 25, 1958 C. R. KEITH ET AL 2,827,995

DRIVE MECHANISM AND STOP MECHANISM

Original Filed Jan. 14, 1953 13 Sheets-Sheet 2

INVENTORS C. R. KEITH
C. A. NICKERSON
BY V. P. Priolo

ATTORNEY

March 25, 1958 C. R. KEITH ET AL 2,827,995

DRIVE MECHANISM AND STOP MECHANISM

Original Filed Jan. 14, 1953 13 Sheets-Sheet 3

INVENTORS C. R. KEITH
C. A. NICKERSON
BY V. P. Priolo
ATTORNEY

DRIVE MECHANISM AND STOP MECHANISM

Original Filed Jan. 14, 1953 13 Sheets-Sheet 4

INVENTORS C. R. KEITH
C. A. NICKERSON
BY V. P. Driolo

ATTORNEY

March 25, 1958 C. R. KEITH ET AL 2,827,995

DRIVE MECHANISM AND STOP MECHANISM

Original Filed Jan. 14, 1953 13 Sheets-Sheet 5

INVENTORS C. R. KEITH
C. A. NICKERSON
BY V. P. Priolo

ATTORNEY

DRIVE MECHANISM AND STOP MECHANISM

Original Filed Jan. 14, 1953 13 Sheets-Sheet 6

INVENTORS C. R. KEITH
C. A. NICKERSON
BY V. P. Piolo
ATTORNEY

DRIVE MECHANISM AND STOP MECHANISM

Original Filed Jan. 14, 1953 13 Sheets-Sheet 7

INVENTORS C. R. KEITH
C. A. NICKERSON
BY V. P. Priolo

ATTORNEY

DRIVE MECHANISM AND STOP MECHANISM

INVENTORS C. R. KEITH
C. A. NICKERSON
BY V. P. Friolo
ATTORNEY

March 25, 1958 C. R. KEITH ET AL 2,827,995

DRIVE MECHANISM AND STOP MECHANISM

Original Filed Jan. 14, 1953 13 Sheets-Sheet 9

INVENTORS C. R. KEITH
C. A. NICKERSON
BY V. P. Priolo

ATTORNEY

March 25, 1958 C. R. KEITH ET AL 2,827,995

DRIVE MECHANISM AND STOP MECHANISM

Original Filed Jan. 14, 1953 13 Sheets-Sheet 10

INVENTORS C. R. KEITH
C. A. NICKERSON
BY V. P. Priolo
ATTORNEY

INVENTORS C. R. KEITH
C. A. NICKERSON
BY V. P. Priolo
ATTORNEY

DRIVE MECHANISM AND STOP MECHANISM

Original Filed Jan. 14, 1953 13 Sheets-Sheet 12

INVENTORS C. R. KEITH
C. A. NICKERSON
BY V. P. Priolo
ATTORNEY

INVENTORS C. R. KEITH
C. A. NICKERSON
BY V. P. Priolo
ATTORNEY

United States Patent Office 2,827,995

Patented Mar. 25, 1958

2,827,995

DRIVE MECHANISM AND STOP MECHANISM

Clyde R. Keith, Maplewood, and Clifford A. Nickerson, Bernardsville, N. J., assignors to Bell Telephone Laboratories, Incorporated, New York, N. Y., a corporation of New York Original application January 14, 1953, Serial No. 331,157. Divided and this application October 26, 1954, Serial No. 464,813

3 Claims. (Cl. 192—142)

This invention relates to drive mechanisms and particularly to drive mechanisms of the kind shown and described in our copending application Serial No. 331,157, filed January 14, 1953, of which the present application is a division.

The above-identified parent application discloses a sound recording and reproducing apparatus for use with telephone systems and adapted to be connected to a subscriber's telephone line for the purpose of automatically receiving and transmitting messages during the absence of the subscriber.

The object of this invention is to provide a drive for an automatic answering and recording device which may be located on the telephone subscriber's premises, and by means of which incoming telephone signals may be automatically answered, a message may be reproduced and transmitted to the calling party, an incoming message may be received and recorded and said transmitted and received messages may be reproduced for the subscriber.

The automatic answering and recording device is a unitary device suitable for use on a desk or table, the general features of which include the utilization of magnetic recording for both the talk-out (transmitted) and talk-in (received) messages. These messages are recorded on individual talk-out and talk-in drums mounted on the same shaft but not connected directly to it.

Each drum is provided with an electromagnetic transducer which is traversed axially along the surface of the magnetizable band or record medium by means of a half-nut which engages a lead screw, causing a helical track to be laid down on the medium. In order to ensure that the track be retraced, the lead screw is driven by the drum through constantly meshed gears which guarantee the maintenance of the orientation of the drum with respect to the lead screw.

In accordance with this invention, the shaft for the drums is driven by a motor by means of a double set of pulleys through two belts preferably made of fabric. The two drums are assembled on this shaft on bearings contained in the drum and each drum is driven from the shaft by means of a constant torque clutch, the collar of which is fixedly attached to the rotating shaft and the plate of which has disposed thereon a compliant member which is in constant frictional engagement with the drum. The combination of the driving belts, pulleys and the compliant clutch member constitutes a mechanical filter or compliant system which minimizes any flutter which may be present in the drums. The clutch arrangement also permits the driving of either drum separately and is utilized to hold the talk-in drum stationary during both the record and reproduce talk-out cycles and to hold the talk-out drum stationary during both the record and reproduce talk-in cycles. Rotation of the drums is prevented by means of a pawl which falls into a notch in the drum.

The nature of the invention and its distinguishing features and advantages will be more clearly understood from the following detailed description and the accompanying drawings in which.

Figure 20:
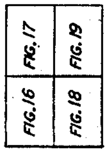
Figure 17:
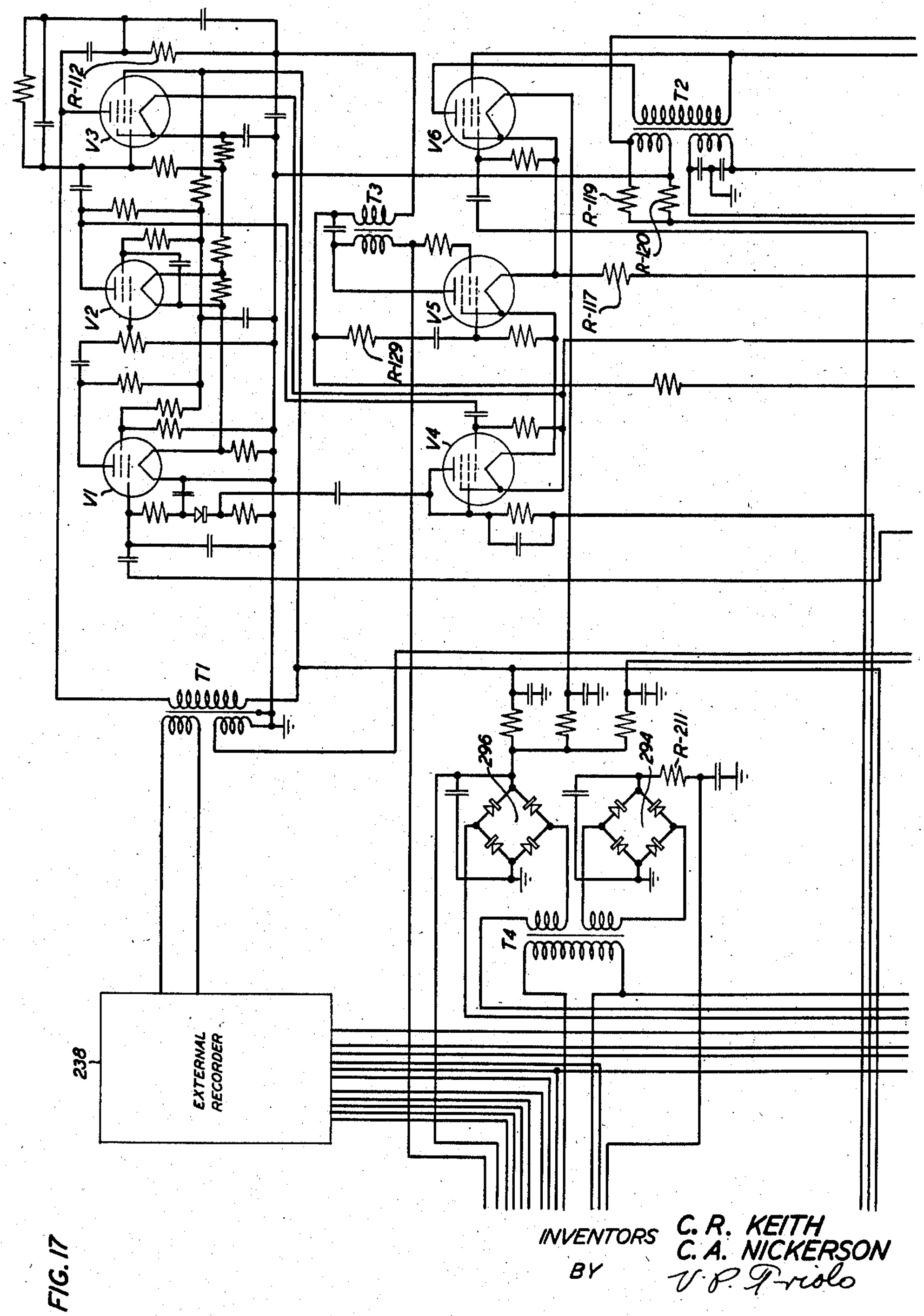
Figure 18:
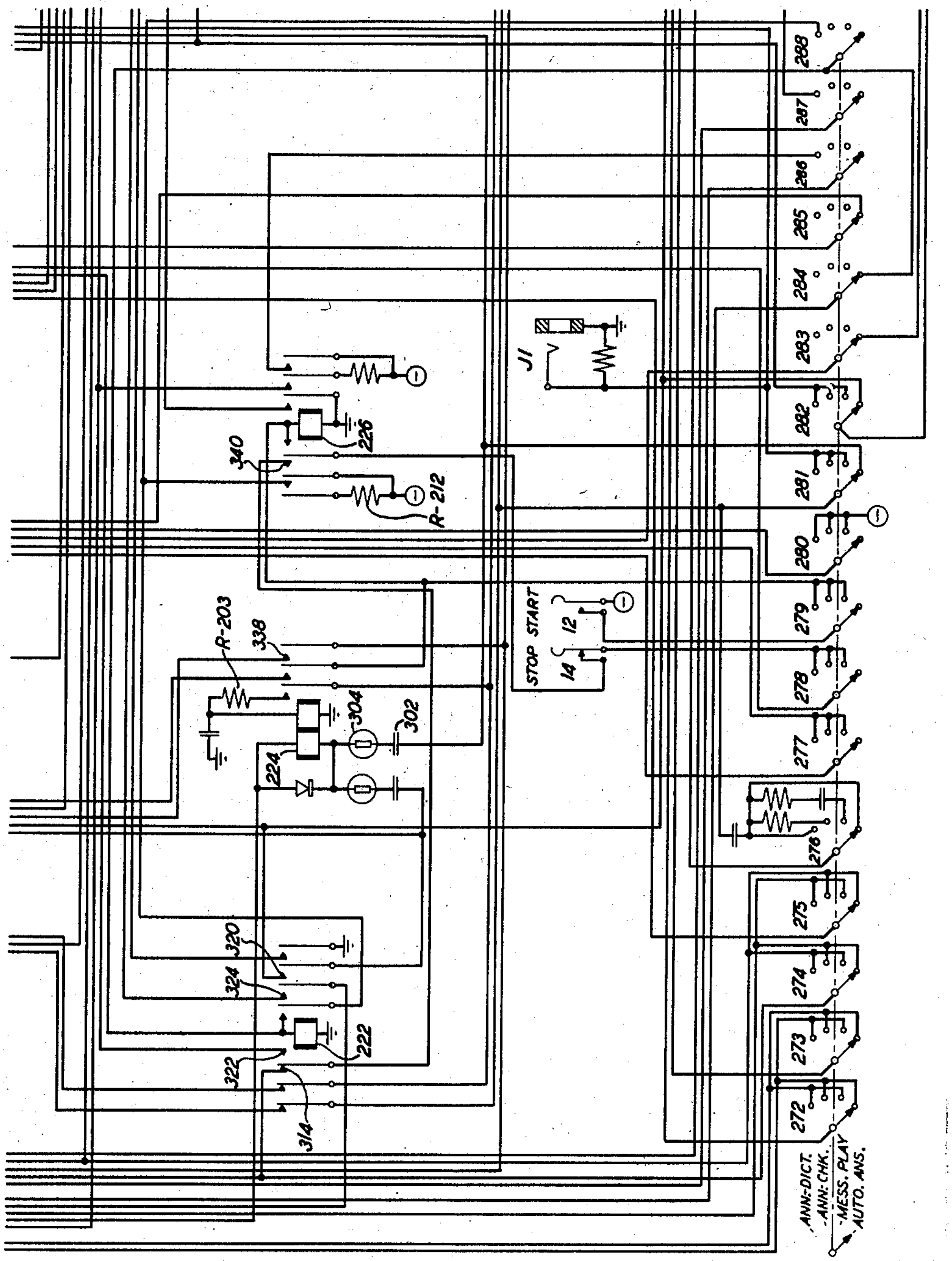
Figure 19:
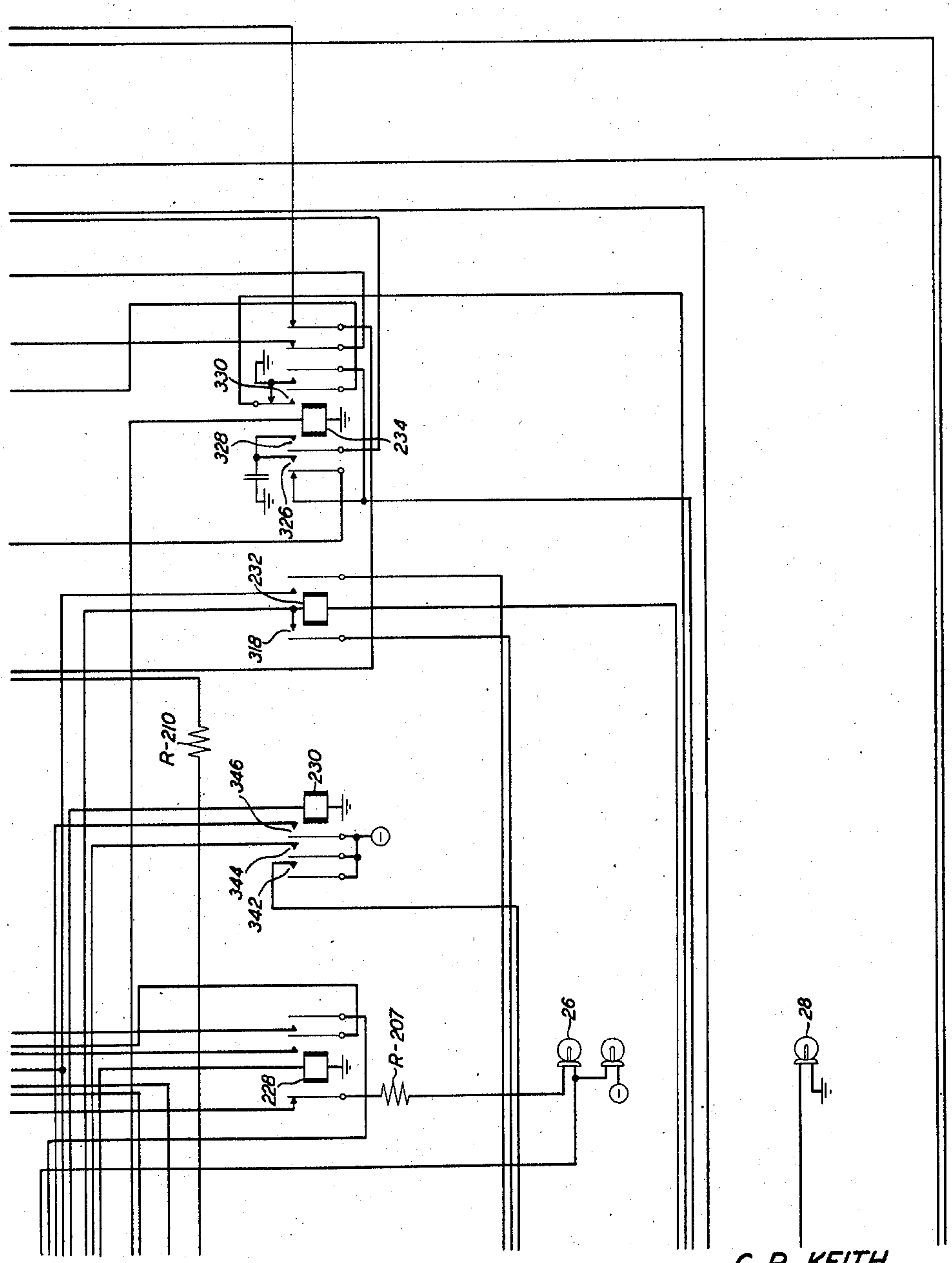

Figs. 16, 17, 18 and 19 when assembled as indicated in Fig. 20 constitute a diagrammatic disclosure of the electrical and mechanical controls for the present invention.

Figure 1:
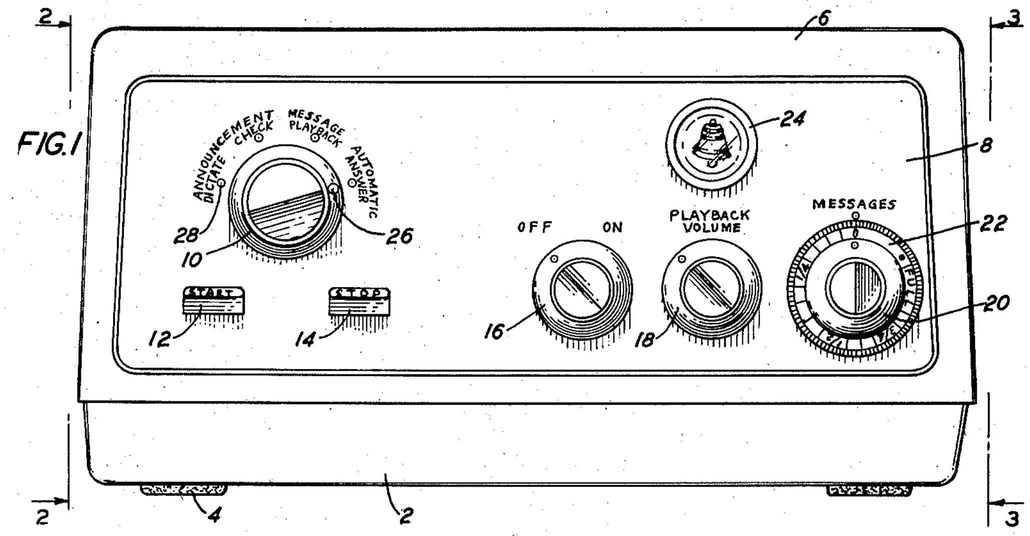
Fig. 1 is a view in front elevation of an embodiment of the sound recording and reproducing apparatus, the components of which are disposed in a cabinet comprising a base, a front panel, and a cover.

As shown in Fig. 1, the entire mechanism of the present invention is enclosed in a metal cabinet, the base 2 of which is equipped with felt covered feet 4, for use on a desk or table, and the cover 6 of which is attached to the base in a conventional manner. The subscriber-operated controls are all mounted on the front panel 8 which is part of the base assembly. These controls consist of the four-position function switch knob 10, start key 12, stop key 14, on-off switch 16, playback volume control 18, message scanning knob 20 and indicator dial 22. In addition there are three indicating lights: the on-off light 24, the ready light 26 and the dictate light 28.

Figure 8:
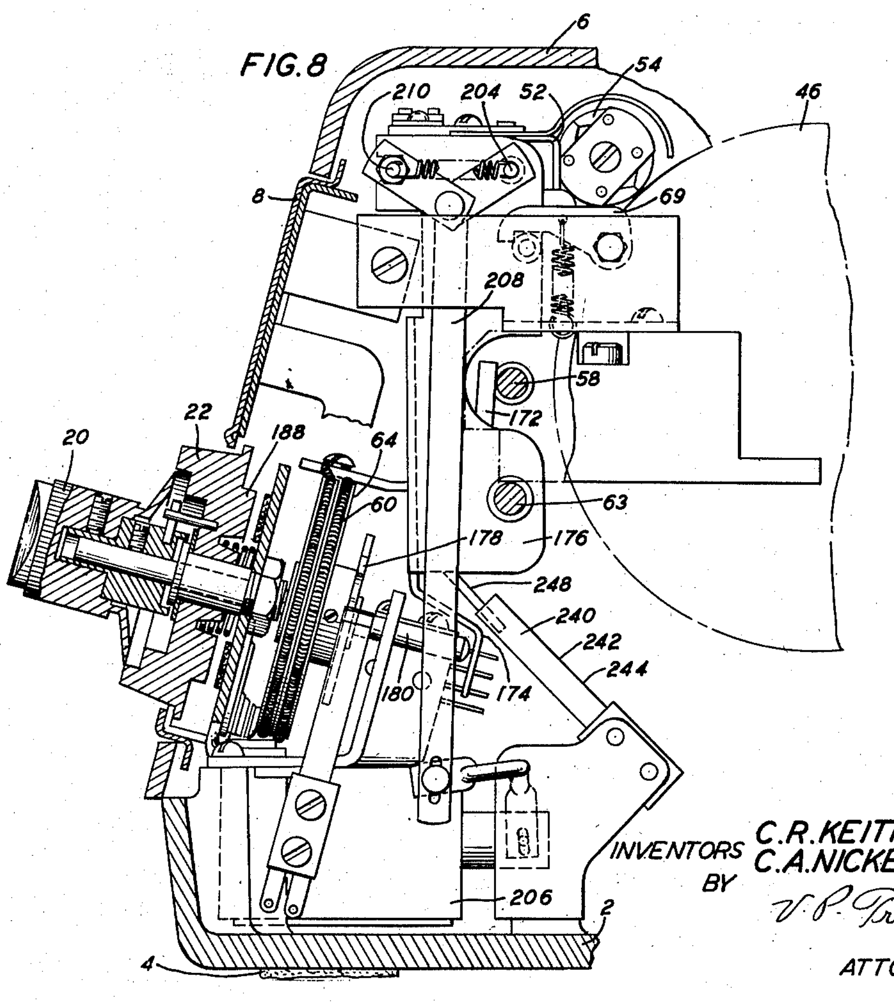
Fig. 8 is a view similar to that shown in Fig. 3 with the components disclosed in greater detail.
Figure 2:
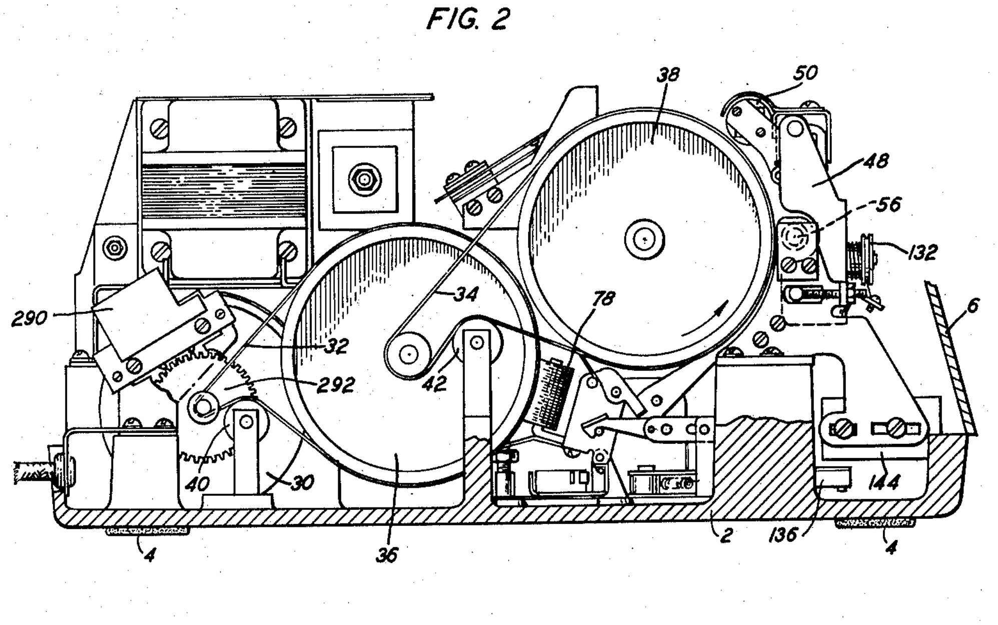
Fig. 2 is a view in side elevation taken on the line 2—2 of Fig. 1 shown partially in section, with the cover and front panel broken away.
Figure 3:
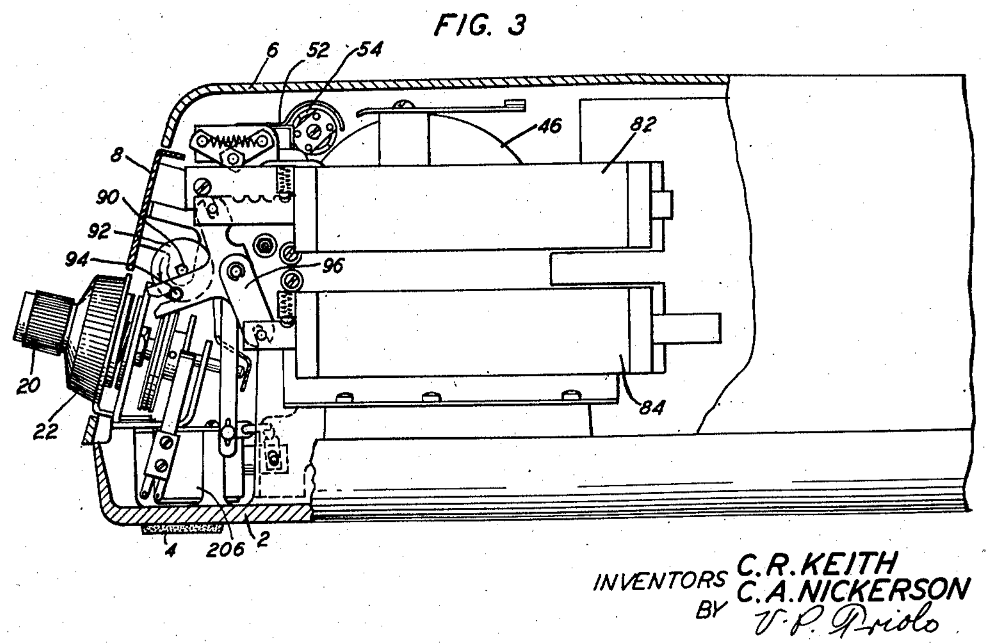
Fig. 3 is a view in side elevation taken on the line 3—3 of Fig. 1 showing partially in section.
Figure 4:
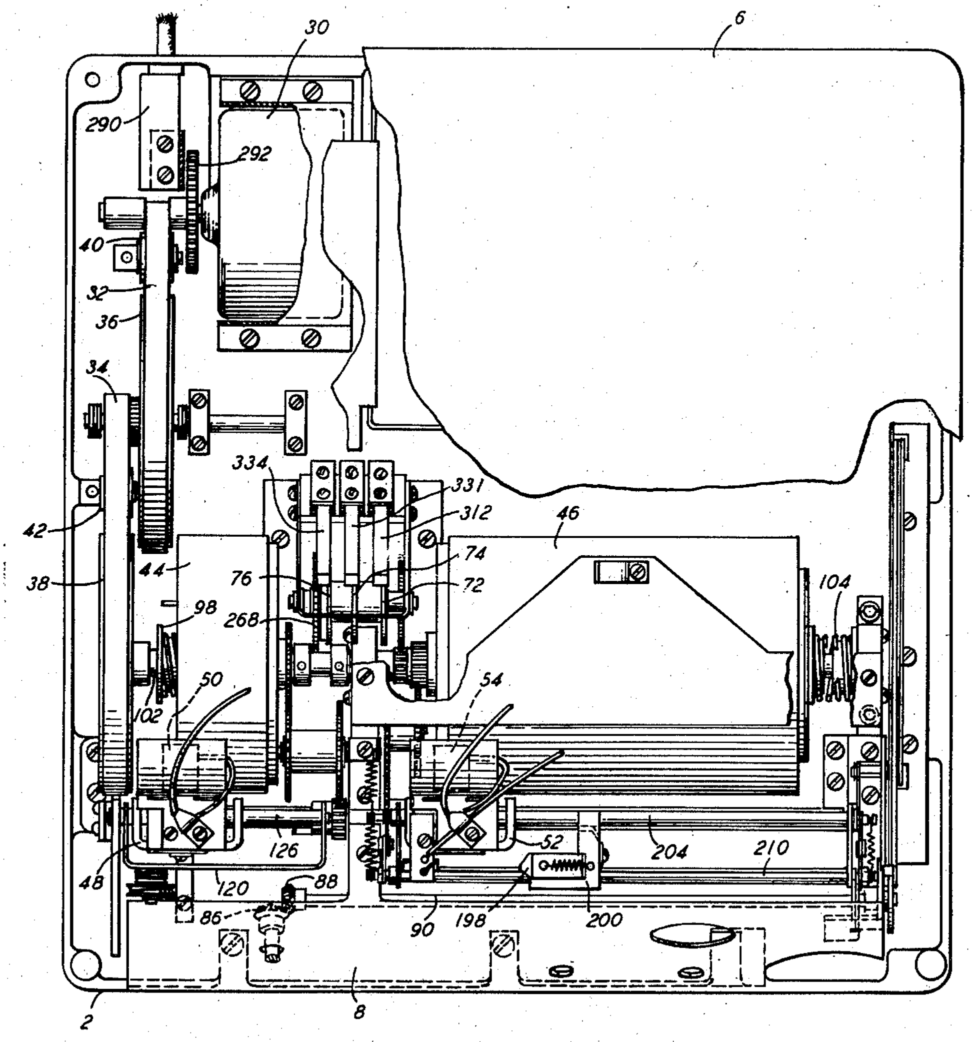
Fig. 4 is a plan view of the embodiment shown in Fig. 1 with the cover broken away and the front panel removed.
Figure 5:
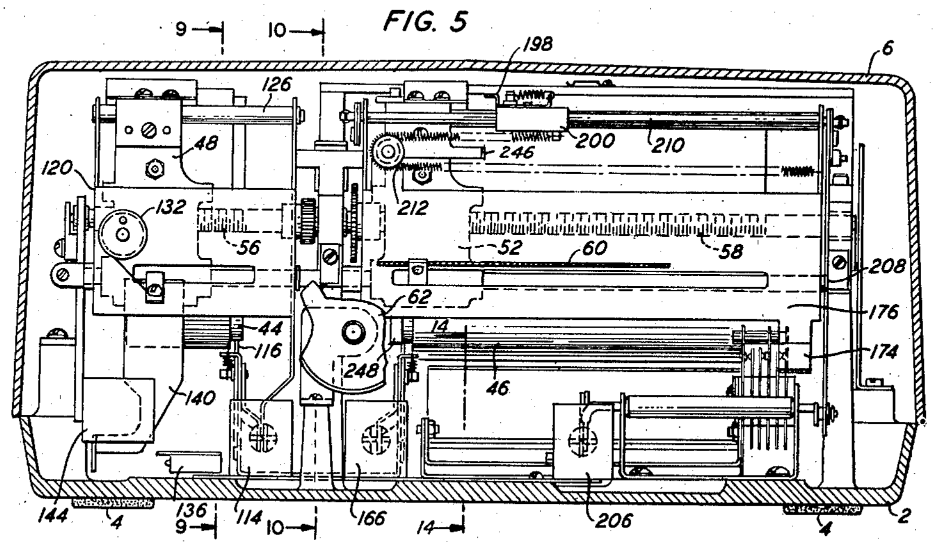
Fig. 5 is a view in front elevation of the embodiment shown in Fig. 1 with the cover broken away and the front panel removed.
Figure 6:
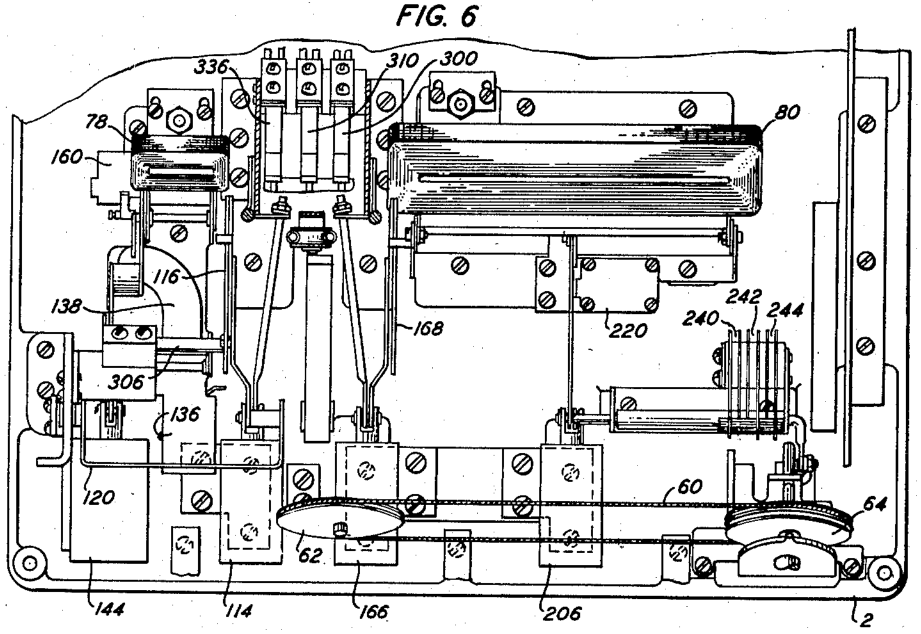
Fig. 6 is a plan view of the embodiment shown in Fig. 1 with the cover, front panel, talk-out drum, talk-in drum and transducer carriages removed.

The mechanical components enclosed within the cabinet 2 as shown in Figs. 2, 3, 4, 5, 6 and 18 are principally a motor 30, a belt drive comprising the endless belts 32 and 34, the pulleys 36 and 38 and the idler pulleys 40 and 42; the talk-out recording drum 44, the talk-in recording drum 46, the talk-out transducer carriage 48 and transducer 50; the talk-in transducer carriage 52 and transducer 54; the talk-out lead screw 56, the talk-in lead screw 58 (Fig. 8); the manual scanning and indicating means comprising the flexible cable 60 and pulleys 62 and 64 which connect the transducer carriage 52 to the message scanning knob 20; the timing cams 66, 68 and 70, which are related to the talk-out drum, timing cams 72, 74 and 76, which are related to the talk-in drum; the talk-out erase coil 78, the talk-in erase coil 80; the slide switches 82 and 84 which are manipulated by means of the function switch knob 10, the gear 86 on the function knob shaft, the gear 88 on the rod 90, the plate 92 on rod 90, the pin 94 on plate 92 and the pivoted T arm 96 to change from one function to another; the constant torque clutch 98 comprising the collar 99 which is rotated continuously by the shaft 102 to which it is keyed, the plate 100 which is slidably attached to the collar 99 by means of the pin 101 and the compliant member 103, preferably a felt ring disposed on the plate 100, which frictionally engages the talk-out drum 44; and the constant torque clutch 104 which is similar to the clutch 98 and frictionally engages the talk-in drum 46.

Figures 7, 13:
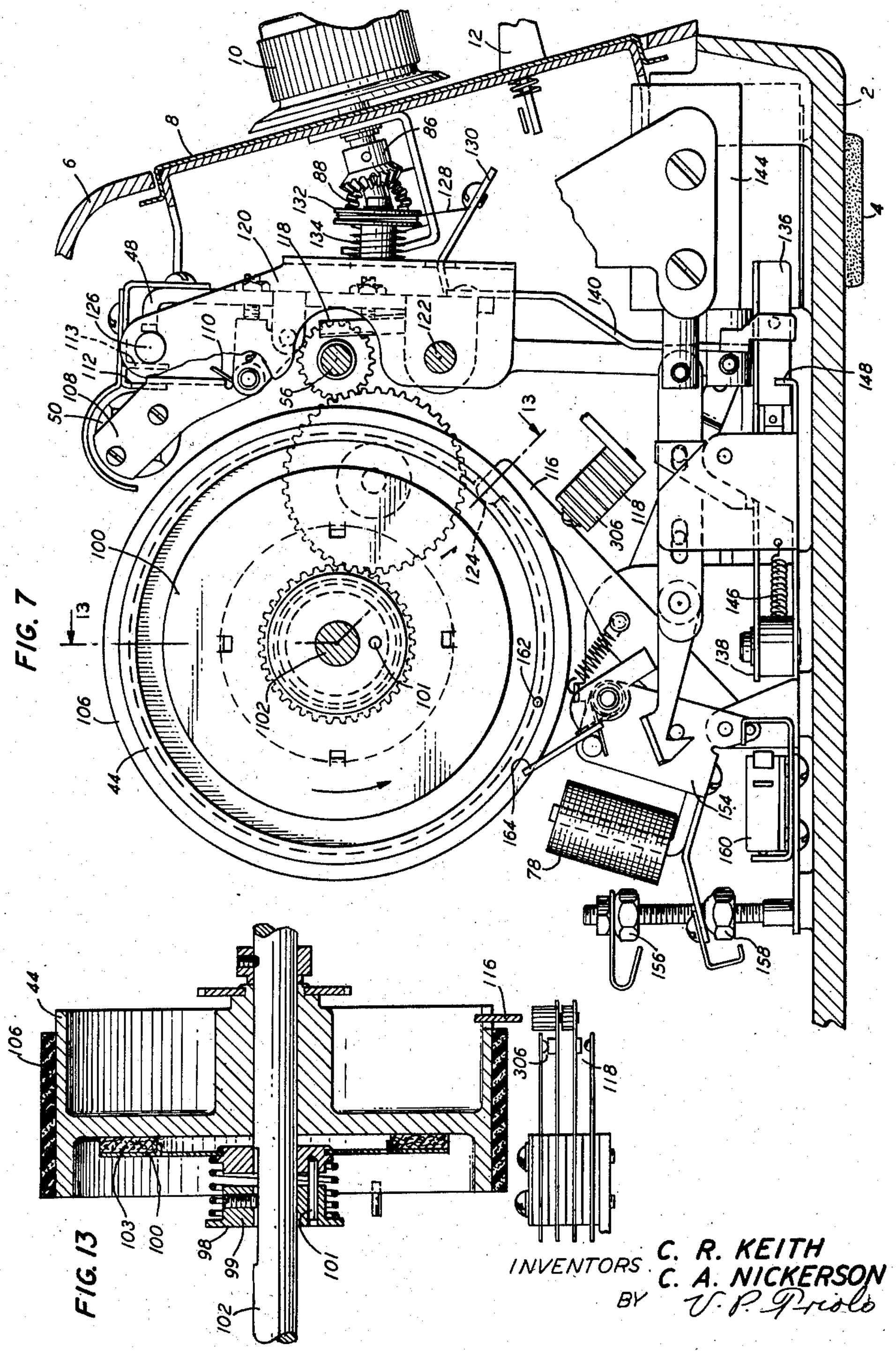
Fig. 7 is a view similar to that shown in Fig. 2 with the components disclosed in greater detail and with the driving elements removed.
Fig. 13 is a sectional view taken on the line 13—13 of Fig. 7 showing the clutch mechanism for the talk-out drum.
Figure 9:
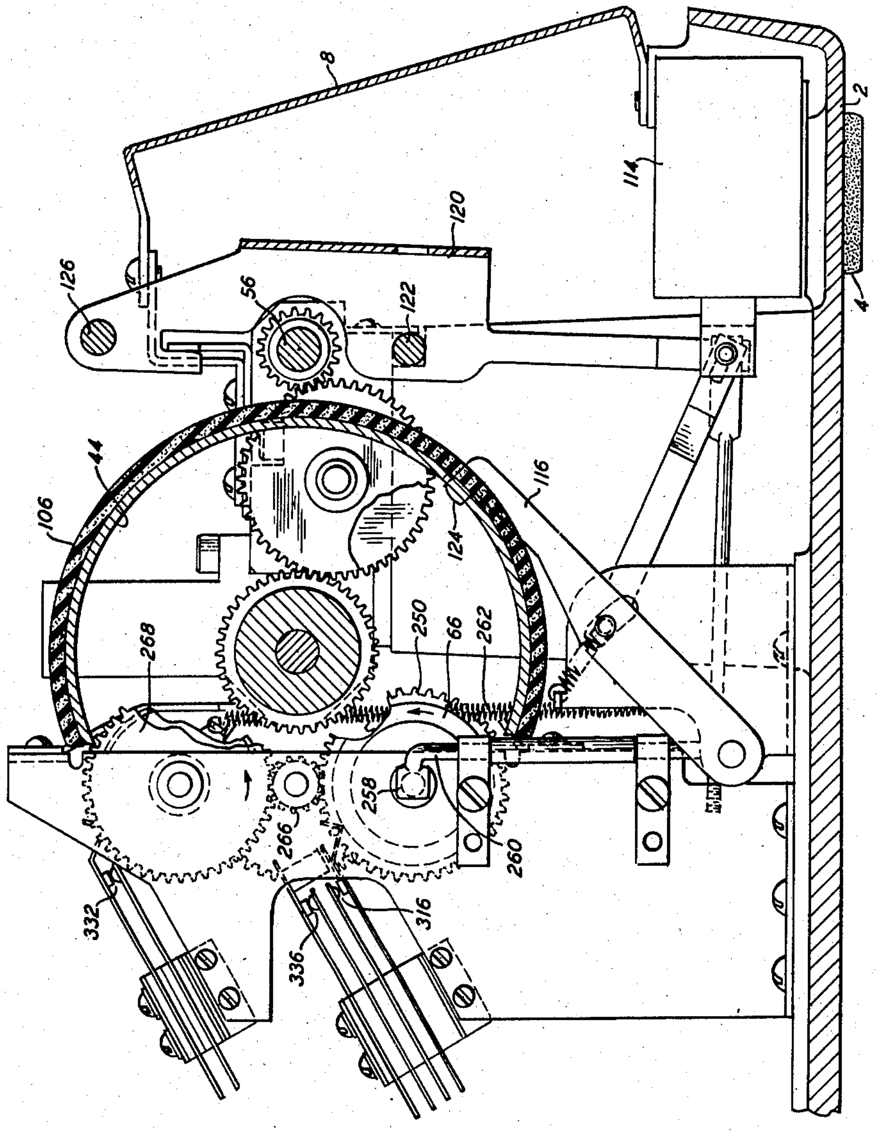
Fig. 9 is a sectional view taken on the line 9—9 of Fig. 5.

The smaller drum 44 which is used for recording and reproducing the "announcement" or outgoing message is arranged to rotate once in about three seconds. As it rotates, the lead screw 56 moves the transducer 50 across the width of the magnetizable band 106 tracing a helical track with 0.10-inch spacing between track centers. A thirty-second message therefore requires ten revolutions or one inch in width. The transducer 50, which is held in contact with the surface of the magnetizable band during the recording and reproducing operations is mounted on a pivoted arm 108 with a spiral spring 110 applying about 20 to 25 grams pressure between the transducer 50 and the magnetizable band 106. The free motion of the arm 108 which permits the transducer 50 to ride continuously on the surface of the magnetizable band despite any imperfections or eccentricities in the band, is controlled by the spring 110 and the stops 112 and 113. When the solenoid 114 is not operated, the pawl 116 stops rotation of the drum 44, the half-nut 118 is disengaged from the lead screw 56 and the transducer 50 is removed from contact with the magnetizable band, as shown in Figs. 7 and 9. When the solenoid 114 is energized the bail 120 is rotated on the guide bar 122 as a pivot so that the pawl 116 is disengaged from the slot 124 in drum 44, allowing the drum to rotate, the half-nut 118 is engaged with the lead screw 56 and the transducer 50 is allowed to come in contact with the band 44.

The transducer carriage 48 is supported by and slides along the bars 122 and 126 which are mounted within the bail 120. The half-nut 118 is a component of the transducer carriage. As the transducer carriage 48 moves from its zero position (from left to right) a cord 128 attached to an arm 130 of the carriage rotates a pulley 132 which winds up a spiral spring 134. When the half-nut is disengaged from the lead screw, this spring pulls the carriage back to its zero position. By causing the drum to stop always in the same position, the transducer always retraces the same track on the magnetizable band. The drum 44 is stopped in a given "index" position by providing a single slot 124 into which the stopping pawl 116 can rest. A switch 119 held closed until the pawl is seated provides a circuit to keep the driving motor running until the drum stops in the required position.

Provision is made for recording and reproducing outgoing messages of any length from 12 to 30 seconds without "dead" time between the end of this message and the beginning of the recording of the incoming message. This is accomplished by means of an adjustable limit switch 136 which is automatically positioned at the end of the travel of the carriage 48. A pivoted arm 138 (Fig. 16) carries switch 136 which is operated by an arm 140 which moves with the carriage 48. A friction pad 142 is arranged so that it normally presses against the arm 138 carrying the switch, holding the switch in a fixed position. When the machine is running with the function switch knob in the "announcement-dictate" position, the solenoid 144 releases the friction pad 142 and allows the switch arm 138 to take up a new position. Since the spring 146 pulls the switch arm 138 toward the zero position the first effect when the friction pad is released is for the switch arm to return to a stop 148 near the zero position. It does not go back to zero because there is provided a minimum outgoing message time of 10 to 15 seconds. When the outgoing message time is greater than the specified minimum time, and the carriage reaches this position, the carriage arm 140 pushes against the switch operating pin 150, moving the switch and arm but not operating the switch. When the subscriber has finished dictating his outgoing message and presses the "stop" key, the solenoid 144 is released, allowing the friction pad to be pressed against the switch arm. This holds the arm and switch in this position for all subsequent operations until a new outgoing message is recorded. Consequently, when the outgoing message is reproduced, the carriage progresses to the end of the message, then the carriage arm operates switch 136 releasing the solenoid 114, and causing the carriage to return to zero. Operation of switch 136 also starts the incoming message drum and operates relays which make the necessary changes in connections for recording incoming messages.

Figure 15:
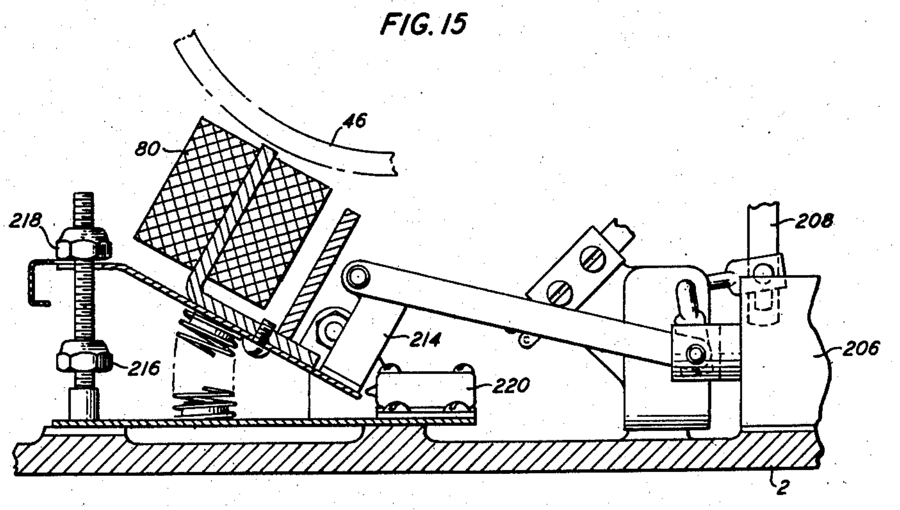
Fig. 15 is a sectional view showing the talk-in erase coil mechanism in the operated position.
Figure 16:
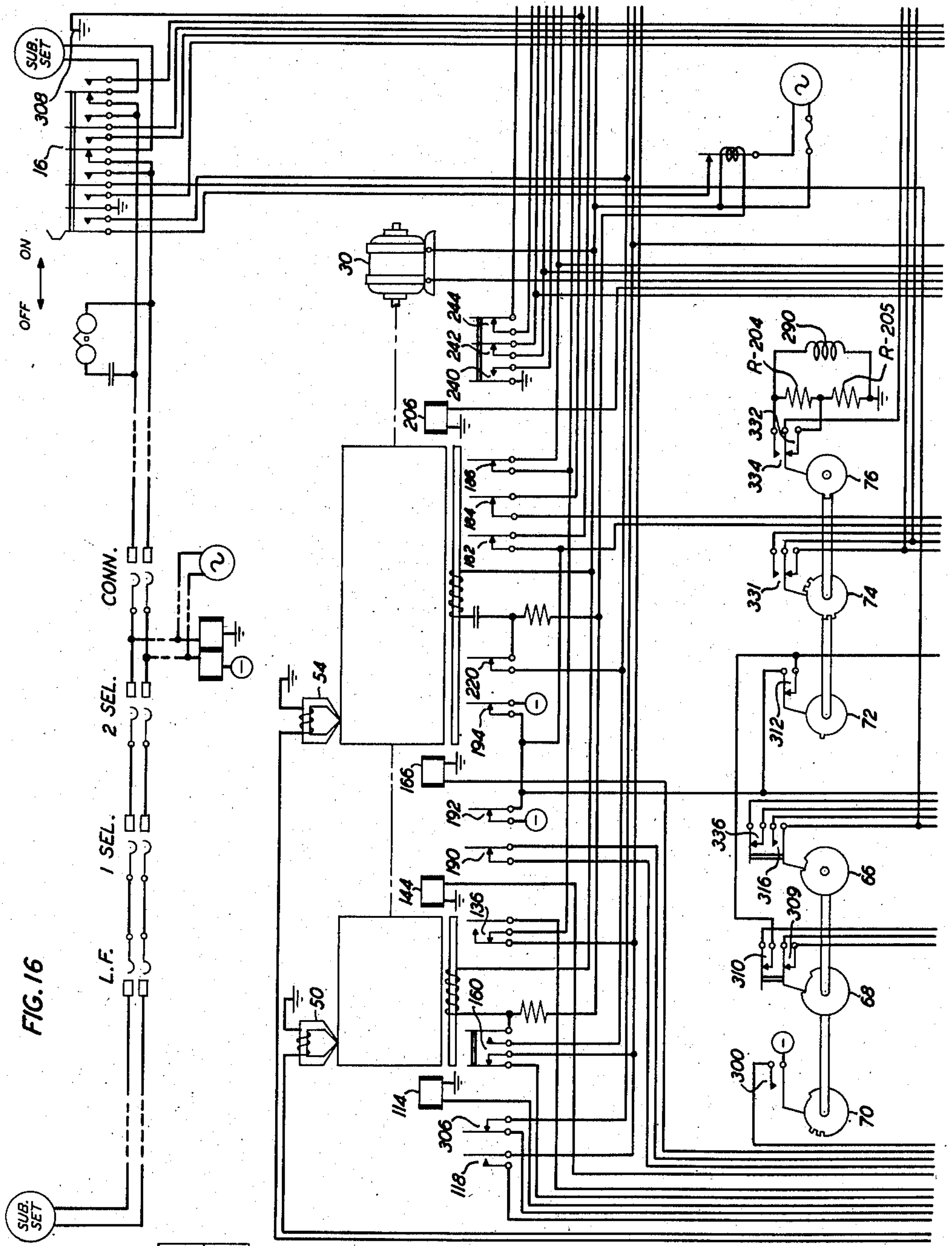

Before a new outgoing message is recorded, the previous one must be erased. This is accomplished by means of an iron core coil 78 which is energized by 60-cycle current and held near the drum 44 for one revolution. The core has a face approximately the length of the record area on the drum so that the entire helical track is erased in one revolution. The erase coil is mounted on a pivoted arm 154 and the stops 156 and 158 are so arranged that the core comes within 0.020 inch of the magnetizable band 106 when erasing but is about 0.4 inch from the band when not in use. This latter distance is to prevent residual magnetization of the band when the erasing current is turned off by switch 160 which is operated just before the coil reaches its rest position. The erase coil is moved to its operating position by the same solenoid 144, which releases the arm 138 holding the adjustable limit switch 136. However, since switch 136 must be released during the entire time of recording the outgoing message but the erase coil is to be operated for only one revolution, the latter is mechanically released by the pin 162 on drum 44. This pin, after one revolution, engages the latch 164 (Figs. 15 and 26) which releases the erase coil 152 while solenoid 144 remains energized. Pin 162 is located so that it does not engage the release latch 164 after the first revolution. The latch 164 assumes its original position, under the pressure of a spiral spring, after it is released by the pin 162.

Figure 10:
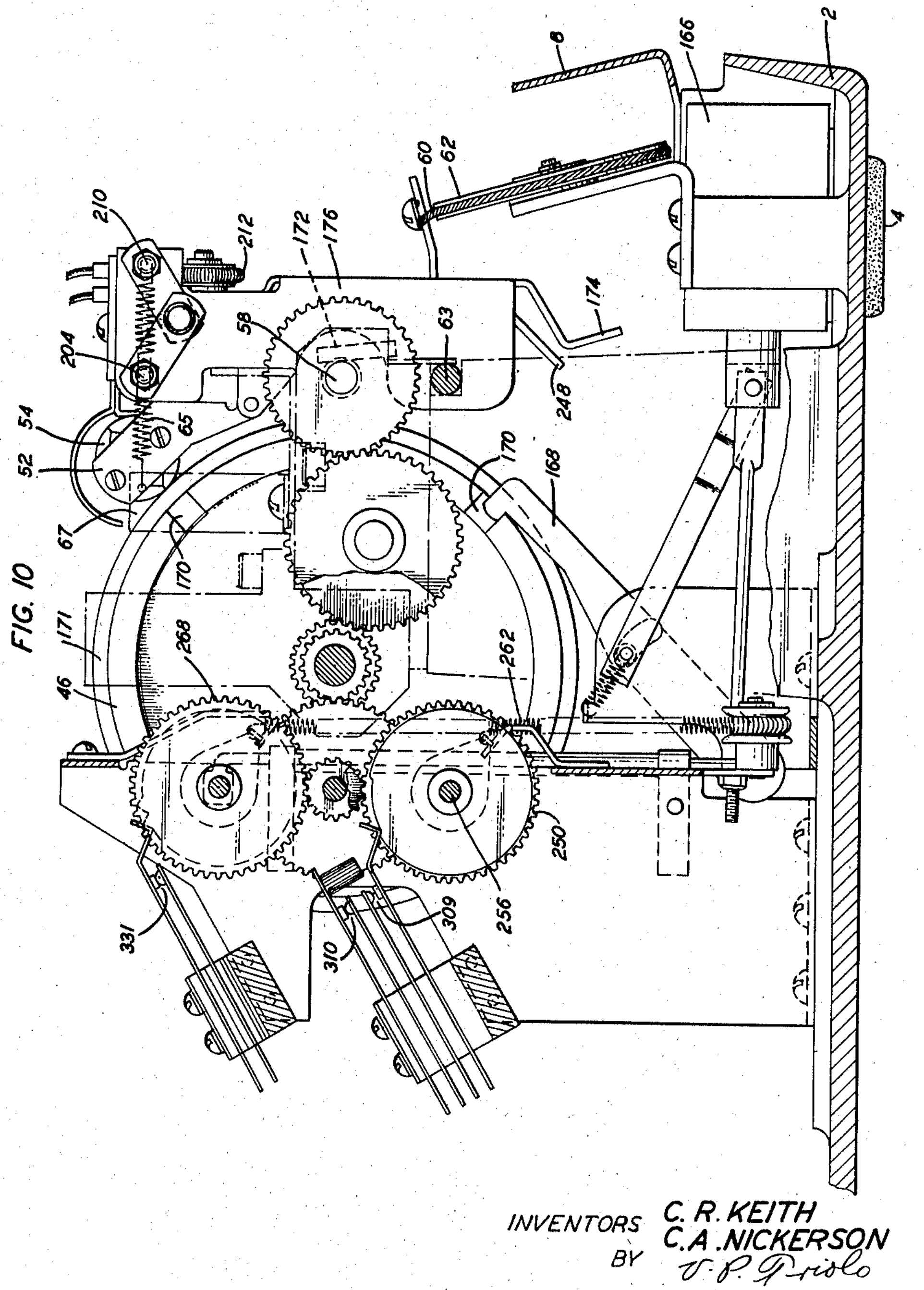
Fig. 10 is a sectional view taken on the line 10—10 of Fig. 5.
Figure 12:
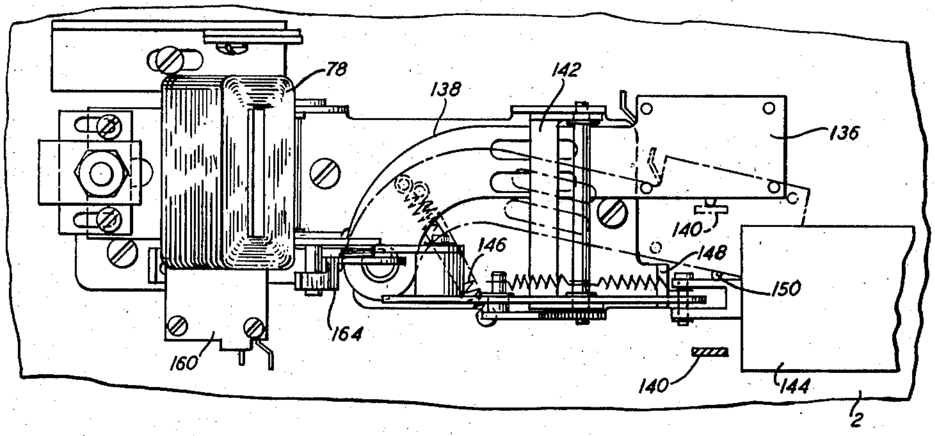
Fig. 12 is a plan view of the erase coil shown in Fig. 11.
Figure 11:
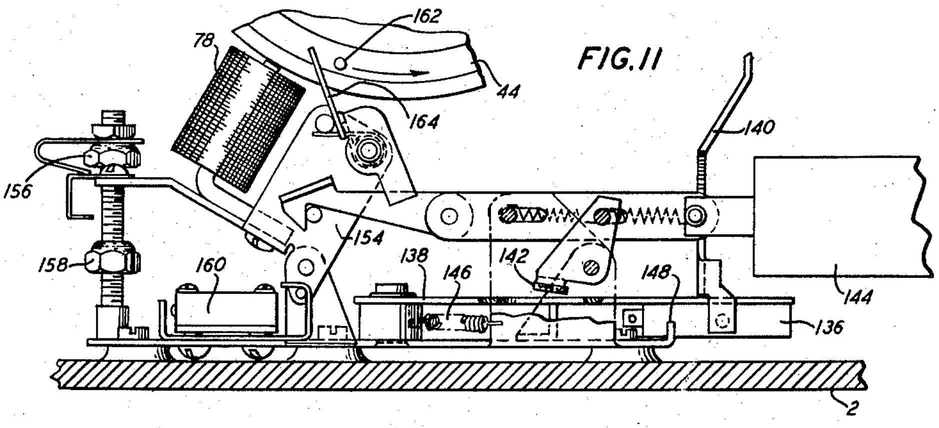
Fig. 11 is a detail view in the operated position of the talk-out erase coil mechanism shown in Fig. 7.
Figure 14:
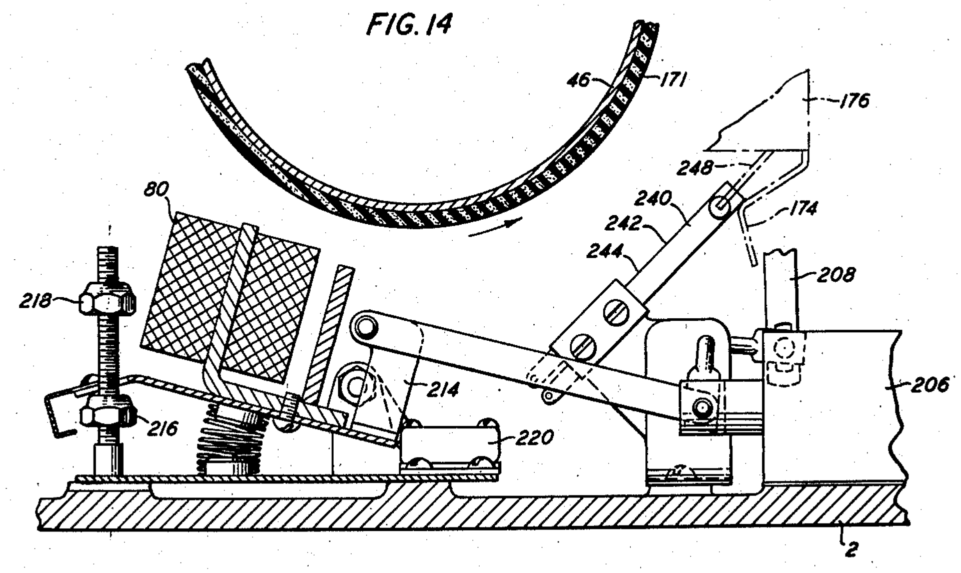
Fig. 14 is a sectional view taken on the line 14—14 of Fig. 5 showing the talk-in erase coil mechanism in the non-operated position.

The larger drum 46, on which incoming messages are recorded, is driven by a continuously rotating clutch 104 similar to that used on the talk-out drum 44 but located at the opposite end, away from the drive pulley 38. Rotation of drum 46 is controlled by the solenoid 166 and pawl 168 (Fig. 10). There are four slots 170 in drum 46 in which the pawl can engage to stop the drum. The four slot arrangement is satisfactory since it is not necessary to stop drum 46 in the same position. As drum 46 rotates it turns the associated lead screw 58 through a gear reduction which provides a track spacing of 0.025 inch, center to center on the magnetizable band 171. The maximum time available for individual talk-in messages is 30 seconds and a total of 10 minutes of recording space is available for recording these messages on drum 46. The transducer 54 is mounted on carriage 52 by means of the spring tensioned pivoted arm 53 and the spring tensioned pivoted bracket 55, with the half-nut 172 adapted to engage the lead screw 58. The pivotal motion of the arm 53 is limited by the stops 57 and 59. The screw 61 is employed to adjust the position of bracket 55 which in turn adjusts the position of arm 53 to provide the required tangency relationship between the transducer and the magnetizable band. The carriage 52 is supported by and slides along the guide bar 63 on which the bail 176 pivots. When the talk-in unit is in condition to receive messages the half-nut 172 is held in engagement with the lead screw 58 by means of the spring member 65 which is attached to the bail 176 and the anchor arm 67. The spring tensioned pivoted arm 69 is employed to dampen any vibratory motion of the bail 176. The stop 57 is also employed to support and guide the carriage 52 along the slide bar 204. There is no provision for automatic return of the carriage 52. Instead carriage 52 is connected by means of the flexible cable 60 and pulleys 62 and 64 (Figs. 6 and 11) to the message scanning knob 20 (Fig. 8) which appears on the front panel. Knob 20 rotates as carriage 52 is moved by lead screw 58 and shows the position of transducer 54. When playing back messages this knob is used for manually moving transducer 54 to any desired part of drum 46 to pick out any message or to repeat a message. Before this can be done it is necessary to disengage the half-nut 172 from lead screw 58, which is done by pushing in on the scanning knob 20. This engages the arm 174 on the bail 176 on which carriage 52 is mounted, moving it enough to release the half-nut 172.

It is to be understood that the above-described arrangements are illustrative of the application of the principles of the invention. Other arrangements may be devised by those skilled in the art without departing from the spirit and scope of the invention.

What is claimed is:

1. In a drive mechanism, a rotatable shaft, a rotatable member supported by said shaft in such manner as to be free to rotate thereon, means for rotating said shaft including a motor and associated circuit means, clutch means adapted to transmit motion from said rotating shaft to said rotatable member, said clutch means comprising a plate member affixed to and actuated by said shaft and a compliant member affixed to said plate member and disposed in constant frictional engagement with said rotatable member, a flywheel, first and second endless belts serially arranged to transmit motion from said motor to said shaft, said first belt being disposed in such manner as to transmit motion from said motor to said flywheel, said second belt being disposed in such manner as to transmit motion from said flywheel to said shaft, said motion transmitting means and said compliant member cooperating to minimize flutter in said rotatable member, detent means on said rotatable member, a pawl engaging said detent means to arrest the motion of said rotatable member, a source of power, means responsive to power from said source for actuating said pawl and causing it to become disengaged from said detent means, means for applying power from said source to said pawl actuating means to permit said compliant clutch member to transmit rotary motion to said rotatable member, means for cutting off said power from said pawl actuating means to cause said pawl to engage said detent means and arrest the motion of said rotatable member.

2. In a drive mechanism, a rotatable shaft, first and second rotatable members supported by said shaft in such manner as to be free to rotate on said shaft independently, means for rotating said shaft including a motor and associated circuit means, first and second clutch means adapted to transmit motion from said rotating shaft to said first and second rotatable members respectively, each of said clutch means comprising a plate member affixed to and actuated by said shaft and a compliant member affixed to said plate member and disposed in constant frictional engagement with the rotatable member related thereto, detent means on each of said rotatable members, a first pawl engaging the detent means on said first rotatable member to arrest the motion thereof, a second pawl engaging the detent means on said second rotatable member to arrest the motion thereof, a source of power, means responsive to power from said source for actuating said first pawl and causing it to become disengaged from said first rotatable member, means responsive to power from said source for actuating said second pawl and causing it to become disengaged from said second rotatable member, means for applying power from said source to said first pawl actuating means to permit the compliant clutch member in frictional engagement with said first rotatable member to transmit rotary motion thereto while the motion of said second rotatable member remains arrested, means for cutting off said power from said first pawl actuating means to cause said pawl to engage said first rotatable member and arrest the motion thereof and for applying power from said source to said second pawl actuating means to permit the compliant clutch member in frictional engagement with said second rotatable member to transmit rotary motion thereto while the motion of said first rotatable member remains arrested.

3. In a drive mechanism, a rotatable shaft, first and second rotatable members supported by said shaft in such manner as to be free to rotate on said shaft independently, means for rotating said shaft including a motor and associated circuit means, clutch means adapted to transmit motion from said rotating shaft to said first and second rotatable members respectively, each of said clutch means comprising a plate member affixed to and actuated by said shaft and a compliant member affixed to said plate member and disposed in constant frictional engagement with the rotatable member related thereto, a flywheel, first and second endless belts serially arranged to transmit motion from said motor to said shaft, said first belt being disposed in such manner as to transmit motion from said motor to said flywheel, said second belt being disposed in such manner as to transmit motion from said flywheel to said shaft, said motion transmitting means and said compliant members cooperating to minimize flutter in said rotatable members, detent means on each of said rotatable members, a first pawl engaging the detent means on said first rotatable member to arrest the motion thereof, a second pawl engaging the detent means on said second rotatable member to arrest the motion thereof, a source of power, means responsive to power from said source for actuating said first pawl and causing it to become disengaged from said first rotatable member, means responsive to power from said source for actuating said second pawl and causing it to become disengaged from said second rotatable member, signal responsive circuit means for applying power from said source to said first pawl actuating means to permit the compliant clutch member in frictional engagement with said first rotatable member to transmit rotary motion thereto while the motion of said second rotatable member remains arrested, switch means operable after a predetermined interval to cut off said power from said first pawl actuating means to cause said first pawl to engage said first rotatable member and arrest the motion thereof and to apply power from said source to said second pawl actuating means to permit the compliant clutch member in frictional engagement with said second rotatable member to transmit rotary motion thereto while the motion of said first rotatable member remains arrested.

References Cited in the file of this patent

UNITED STATES PATENTS

| | | |
|---|---|---|
| 1,930,159 | Criley | Oct. 10, 1933 |
| 1,974,207 | Ellinger | Sept. 18, 1934 |
| 2,546,980 | Collins | Apr. 3, 1951 |
| 2,676,289 | Wulfsberg et al. | Apr. 20, 1954 |
| 2,702,609 | Frazier et al. | Feb. 22, 1955 |
| 2,707,618 | Brown | May 3, 1955 |